Patented Nov. 7, 1939

2,179,130

UNITED STATES PATENT OFFICE 2,179,130

COCOA AND SUGAR COMPOUND AND METHOD OF MAKING SAME

Herbert T. Middleton, Englewood, N. J., assignor, by mesne assignments, to Corn Products Refining Company, New York, N. Y., a corporation of New Jersey No Drawing. Application December 12, 1934, Serial No. 757,194

2 Claims. (Cl. 99—26)

This invention relates to the production of a dry powdered cocoa or chocolate and sugar compound; and the primary object of the invention is to provide a compound of this character which will be readily miscible with and suspendable in a liquid; for example, which is of such character that it may be evenly dispersed through and suspended in cold milk by stirring with a spoon in distinction to requiring the more vigorous stirring by a mechanical agitator.

In carrying out the invention the cocoa in a dry and powdered state is coated or loaded with sugar, that is, the cocoa particles are covered by bodies of sugar, preferably dextrose sugar because of its superior dietetic characteristics and lesser degree of sweetness in comparison, for example, with sucrose. Cocoa contains a considerable quantity of fat usually about 10% to 20%, and, even in a finely divided state, is miscible with a cold liquid, such as milk only with considerable difficulty. The dry powdered cocoa, which is light in weight, and repels water because of its oil content, is not readily wetted when put into a liquid and tends to rise to the top of the liquid and to float there as partly dry and agglomerated masses. The loading or coating of the cocoa particles with sugar appears to give them weight and magnitude that facilitates even distribution in the liquid. The dissolving of the sugar which coats or is associated with the individually dispersed cocoa particles brings about the wetting of the particles separately and the maintenance of the solids in suspension. The desired effect is enhanced by the use of dextrose as a sugar instead of sucrose because more dextrose can be employed for any desired sweetening effect. At any rate, by following the procedure which will be described, a powdered cocoa and sugar compound is producible which can be easily and quickly mixed and uniformly suspended in cold milk, for example, by merely stirring with a spoon.

In carrying out the invention, a syrup of the proper concentration for crystallization, when combined with cocoa, is first made by mixing and preferably boiling the sugar with water. The hot syrup is then poured on dry powdered cocoa in a mixer provided with heating and stirring or agitating means; or the cocoa may be mixed with a part of the syrup and this mixture stirred into the rest of the syrup. In any case the hot syrup and dry cocoa are thoroughly mixed together so that the cocoa particles are dispersed as uniformly as possible through the syrup. The mixture (to which flavoring or other materials may be added) is then allowed to cool and crystallize, preferably in pans or shallow moulds; after the compound in the pans has solidified it is preferably comminuted or pulverized.

To give a specific example: 100 pounds of high purity crystalline dextrose, for example dextrose hydrate is mixed with 20 pounds of water and heated in a closed jacketed kettle with stirring, to a temperature between 230° and 280° F., preferably until a temperature of about 240° F. has been reached. The water, that is, is originally in excess and is boiled out until a proper density for crystallization has been reached. The syrup is then discharged into a steam heated mixer, provided with an agitator, upon 25 pounds of cocoa which has been placed in the mixer. The agitator is kept in motion until the syrup and cocoa are thoroughly mixed. Preferably steam is circulated through the jacket of the mixer to keep the materials at the temperature at which the syrup enters until the mixing operation is complete. Then the steam is turned off and the syrup is allowed to cool slightly. Flavoring material such as vanillin is added and mixed into the compound when the latter is at a temperature of about 180° F. The charge is then dropped into sugar pans where the sugar crystallizes in solid mass in which the dispersed cocoa particles are embedded. The crystallizing operation may take from 24 to 48 hours, and the cakes when taken from the pans are quite hard. The cakes are ground, passed through thirty-mesh screen, and the tailings returned to the mill for grinding. The degree of pulverization or comminution may be varied. If substantially all of the ground material will pass through a thirty mesh screen—a degree of pulverization found acceptable—many of the particles will necessarily be much more finely ground than others.

With the procedure as above outlined the product will be dry, containing about 3%–5% moisture so that it will not become sticky or cake.

The proportions as between cocoa and dextrose (1 to 4, in the example given) may be varied quite considerably. A suitable compound can be made with the proportions of cocoa to sugar 1 to 9; and other proportions may be used according to the requirement for sweetness. If sucrose is used the amount of sugar in proportion to cocoa will have to be diminished for any desired degree of sweetness. Malt sugar, dried corn syrup or other substances may, if desired, be incorporated into the mixture prior to the crystallizing operation.

The ground material consists of cocoa particles covered or loaded with crystallized dextrose or other suitable sugar.

It is the intention to cover by patent all modifications within the scope of the appended claims.

I claim:

1. Method of making a cocoa compound of the character described which comprises melting high purity dextrose with water and cooking the syrup at a temperature between 230° and 280° F. to concentrate the same to a density at which the sugar will solidify, mixing the syrup with dry powdered cocoa, allowing the mixture to form a crystallized mass in a mold, and pulverizing the crystallized mass to a fineness which will allow substantially all of it to pass through a 30 mesh screen.

2. Method of making a finely divided, non-hygroscopic, relatively soluble, cocoa-dextrose compound which comprises mixing a hot, high purity, dextrose syrup with dry, powdered cocoa, cooling the mixture and allowing the same to form a crystallized mass in a mold and then mechanically comminuting the crystallized mass to a fineness which will allow substantially all of it to pass through a 30 mesh screen.

HERBERT T. MIDDLETON.